Jan. 14, 1958  L. E. ALBERTS  2,820,116
VERTICAL SENSOR
Filed Dec. 12, 1955

INVENTOR.
LAWRENCE E. ALBERTS
BY
Joseph E. Ryan
ATTORNEY

United States Patent Office 2,820,116
Patented Jan. 14, 1958

2,820,116

VERTICAL SENSOR

Lawrence E. Alberts, Minneapolis, Minn., assignor to Minneapolis-Honeywell Regulator Company, Minneapolis, Minn., a corporation of Delaware Application December 12, 1955, Serial No. 552,649

5 Claims. (Cl. 200—61.45)

The novel device disclosed is a vertical sensing unit which utilizes the buoyancy of a float to determine the true vertical direction and is more particularly directed to a novel contact arrangement to activate an electrical circuit upon tilting of the device.

Numerous devices have been used in the past to indicate a true vertical direction, and these devices vary in complexity from a simple bubble type level to expensive, complicated pendulous gyroscopes. For the most part, vertical sensing devices which are simple in construction and inexpensive to build have very limited application as they lack sensitivity and a convenient method of utilizing their indication for control purposes. In addition to these disadvantages many of the types of vertical sensing devices are subject to false indications upon acceleration and deceleration of the device. This is particularly true of the vertical sensing devices of the pendulous type. Many types of vertical sensors such as gyroscopes and the float type vertical sensing devices, which utilize magnetic pick-offs, are relatively expensive and are difficult to produce.

The float type vertical sensing device herein disclosed can be constructed quite easily, inexpensively, and subject or not subject to accelerations depending on its details of construction. Test models of this device have shown it possible to distinguish a variation from vertical of approximately one-sixteenth of one degree.

The primary object of this invention is to provide a float type vertical sensing device having a contact structure that encloses the means used to restrain the float and thereby complete circuits upon the tilting of the sensor.

A further object of this invention is to disclose a vertical float type sensor that can be made sensitive or insensitive to accelerations by simple mechanical modifications.

Still a further object of this invention is to disclose a vertical sensor that can be made extremely sensitive to tilt while being inexpensive to manufacture.

Another object of this invention is to disclose a vertical sensor that can be utilized as an inexpensive tip-over type switch.

These and other objects will become apparent upon consideration of the following specification when considered with the drawings made a part thereof.

Figure 1:
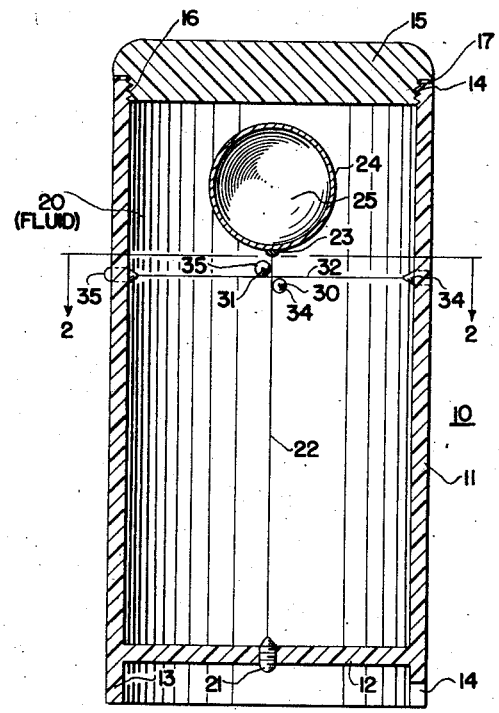
Figure 1 is a cross-section through the side of the vertical sensor in the disclosed preferred embodiment.

In the preferred embodiment disclosed, a cylindrical container is disclosed generally at 10. This container has a tubular insulating wall 11 and a bottom 12. The bottom end 12 may easily be made as an integral part of container 10, or it may be a circular member secured in the container 10 to form a fluid tight bottom therefor. The cylindrical tube 11 is extended beyond the bottom 12 to form a base 13. The base 13 has an opening 14, the purpose of which will be described below. It is understood that the base 13 and the opening 14 could be replaced by an arrangement such as three or more legs upon which the vertical sensing device would rest.

The top end of container 10 has internal threads 14 cut into the cylindrical tube 11. A cover 15, having threads 16 on a recessed portion thereof, is tightly screwed into the cylindrical tube 11. The cover 15 and the container 10 are separated by a fluid sealing gasket 17. A filling tube (not shown) passes through cover 15 and is utilized to completely fill container 10 with a suitable nonconductive fluid generally shown at 20.

Prior to the filling of container 10 with fluid 20, a metallic contact plug 21 is sealed into the center of the bottom 12. Attached to plug 21 is a flexible contact wire 22 which in turn is connected at 23, to a float 24. The float 24 may be constructed in any convenient manner to provide a fluid tight space 25. The fluid tight space 25 is filled with a light fluid, such as a gas, so that the float 24 is buoyed upward in container 10 by the fluid 20. With this arrangement the contact wire 22 is held taut in a vertical direction.

Figure 2:
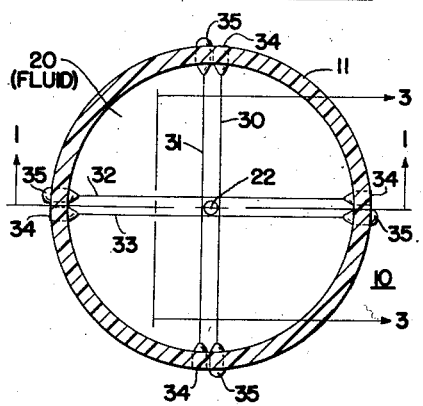
Figure 2 is a cross-section of Figure 1 along line 2—2 as noted in Figure 1.
Figure 3:
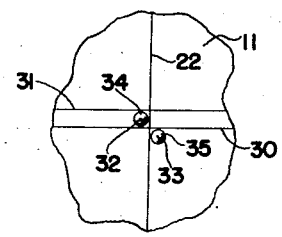
Figure 3 is a partial cross-section along lines 3—3 of Figure 2, showing the contact wire arrangement.

Four contact wires 30, 31, 32, and 33 are attached to the wall 11 of the container 10. Each of the contact wires 30, 31, 32 and 33 are held in position in the wall 11 by pairs of metal plugs 34 and 35. It is noted that each of the contact wires and its associated pair of plugs 34 and 35 are in slightly different parallel planes. With this arrangement each of the contact wires, 30, 31, 32 and 33 are electrically separated from one another. It will be also noted that the contact wires 30, 31, 32 and 33 form a small enclosed space (which can best be seen in Figure 2) and which confines or encircles conductor 22.

When the container 10 is in a perfectly upright position, contact wire 22 does not touch any of the remaining contact wires 30, 31, 32 or 33. If however, the container 10 is tipped, the contact wire 22 will touch at least one of the other contact wires. If the container 10 is tipped properly the contact wire 22 will touch two of the other contact wires at a point where they would cross. It can be readily seen that with this arrangement it would be possible to complete a control circuit (not shown) connected between plug 21 and at least one of the plugs 35.

As previously noted an opening 14 has been left in the wall 11 of container 10 and this opening has been provided to allow a wire (not shown) to pass through the wall 11 to plug 21 to complete the previously mentioned control circuit. The novel control device herein disclosed can be readily attached (by any convenient means) to a platform that is to be kept level and act as a sensing means for a leveling control system.

It should be noted that numerous modifications could be made in the device disclosed and several of these modifications are herein outlined. The container 10 can be filled either with a liquid or a gas as long as the float 24 is filled with a liquid or gas which yields a buoyancy great enough to keep the wire 22 taut. If the container 10 is filled with a liquid and the float 24 is filled with a gas the inertia of the float 24 can be kept to a very low value. With this type of construction the unit would be relatively free of movement when the container 10 was used on a device which was subject to rapid accelerations. To further assist in eliminating fluctuation due to accelerations, the liquid 20 could completely fill the container 10 by utilizing the previously mentioned filler tube.

If a device were desired which would be subject to acceleration as well as providing a vertical sensing control, the container 10 could be filled with only enough liquid to offset the weight of the float 24. It is further noted that the weight of 24 could be made relatively substantial and with this arrangement the float 24 would also be subject to movement upon an acceleration of the container 10.

Additional modifications can be made in this device by utilizing any number of contact wires in excess of three. It is further noted that the contact wires could be replaced by any number of rigidly supported contacts which substantially encircle the float contact wire 22.

It is obvious from the above discussion of different modifications which could be made in this device that the unit is subject to many possible combinations of structure and fluid fills. In view of this the applicant wishes to be restricted in the scope of his invention only to the extent of the appended claims.

I claim as my invention:

1. In a vertical sensing device: a nonconductive cylindrical container having a liquid tight top and bottom, and being filled with a nonconductive liquid; an air filled float secured in the container through said bottom by a flexible conductive wire; and four electrical contact wires, each secured through the container in different parallel planes and enclosing said flexible conductive wire; said flexible conductive wire touching at least one of said contact wires upon tilting of said container.

2. In a vertical sensing device: a nonconductive cylindrical container having a fluid tight top and bottom, and being filled with a nonconductive fluid; a buoyant float restrained in said container through said bottom by a flexible conductor; and a plurality of contact wires secured through the container in different parallel planes, and enclosing said conductor; said conductor touching at least one of said wires upon tilting of said container.

3. In a device of the class described; a container of insulating material having fluid tight ends, and being filled with a dielectric fluid; a buoyant float restrained in said container to one said end by flexible conductive means; and a plurality of contacts secured to said container and enclosing said conductive means; said conductive means completing contact with at least one said contacts upon tilting of said container.

4. In a device of the class described: a container having a plurality of walls and containing a fluid; a buoyant float restrained in said container by flexible conductive means; and a plurality of contacts secured to said container walls and encircling said conductive means; said conductive means completing contact with at least one said contact upon disturbing said container.

5. In a device of the class described, a vessel containing a fluid, a buoyant float restrained in said vessel by flexible conductive means, and contact means secured to said vessel and substantially encircling said conductor means, said conductive means completing contact with said contact means upon disturbing said container.

References Cited in the file of this patent

UNITED STATES PATENTS

| | | |
|---|---|---|
| 1,142,218 | Wood | June 8, 1915 |
| 1,237,734 | Wood | Aug. 21, 1917 |